United States Patent [19]

Baba

[11] Patent Number: 5,341,176
[45] Date of Patent: Aug. 23, 1994

[54] AUTOMATIC FOCUS ADJUSTER FOR PROJECTION DISPLAY SYSTEMS HAVING IN-OPERATION AND END-OF-OPERATION SYMBOLS SUPERIMPOSED OVER VIDEO DATA

[75] Inventor: Hiroyuki Baba, Suwa, Japan
[73] Assignee: Seiko Epson Corporation, Tokyo, Japan
[21] Appl. No.: 971,861
[22] PCT Filed: May 31, 1991
[86] PCT No.: PCT/JP91/00740
§ 371 Date: Mar. 29, 1993
§ 102(e) Date: Mar. 29, 1993
[87] PCT Pub. No.: WO92/22007
PCT Pub. Date: Dec. 10, 1992
[51] Int. Cl.5 ............................................. H04N 5/74
[52] U.S. Cl. ..................................... 348/569; 348/745
[58] Field of Search ................. 358/231, 236; 353/57, 353/85, 101; 348/569, 745; H04N 5/74, 9/31

[56] References Cited

U.S. PATENT DOCUMENTS 5,136,397  8/1992  Miyashita ........................ 358/231

FOREIGN PATENT DOCUMENTS 454451  10/1991  European Pat. Off. ........ H04N 5/74
22189   6/1974   Japan .
6046    3/1978   Japan .
39032   3/1982   Japan .
104918  6/1982   Japan .
97123   6/1984   Japan .
128314  8/1985   Japan .
247631  12/1985  Japan .
67012   4/1986   Japan .
240108  10/1986  Japan .
261710  11/1986  Japan .
275615  12/1986  Japan .
204010  8/1989   Japan .
214828  8/1989   Japan .
90135   3/1990   Japan .
3-261284 11/1991 Japan ............................ H04N 5/74
4-10785  1/1992  Japan ............................ H04N 5/74
4-70076  3/1992  Japan ............................ H04N 5/74
4-124980 4/1992  Japan ............................ H04N 5/74

Primary Examiner—Mark R. Powell
Attorney, Agent, or Firm—Raymond J. Werner

[57] ABSTRACT

A projection type display system which comprises an optical modulator for modulating a light in accordance with video data, a projection lens system for projecting the modulated light onto a screen, and focal adjuster for the projection lens system for adjusting the focal state of the image focused onto the screen. The focal adjuster includes a range finding unit for finding the distance between the projection lens and screen with an invisible light, and automatic adjustment for adjusting the focal point of the projection lens system to an optimum focal point.

6 Claims, 5 Drawing Sheets

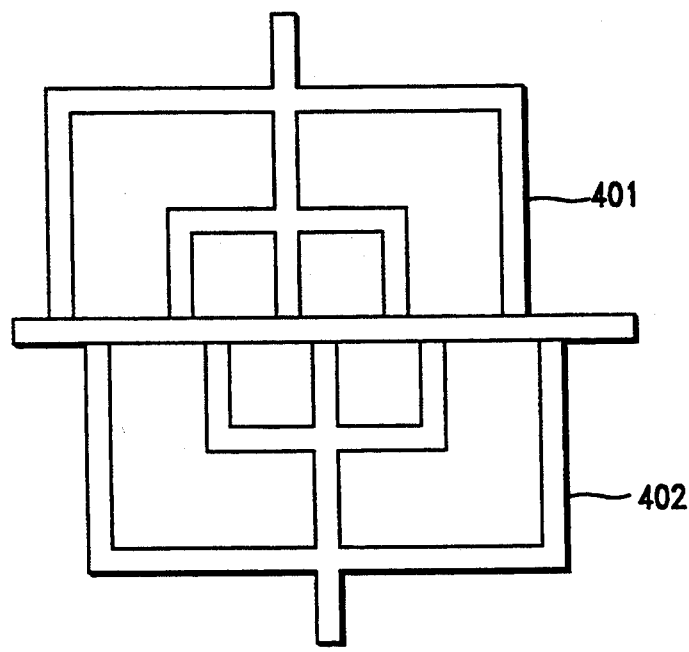
FIG.—7A
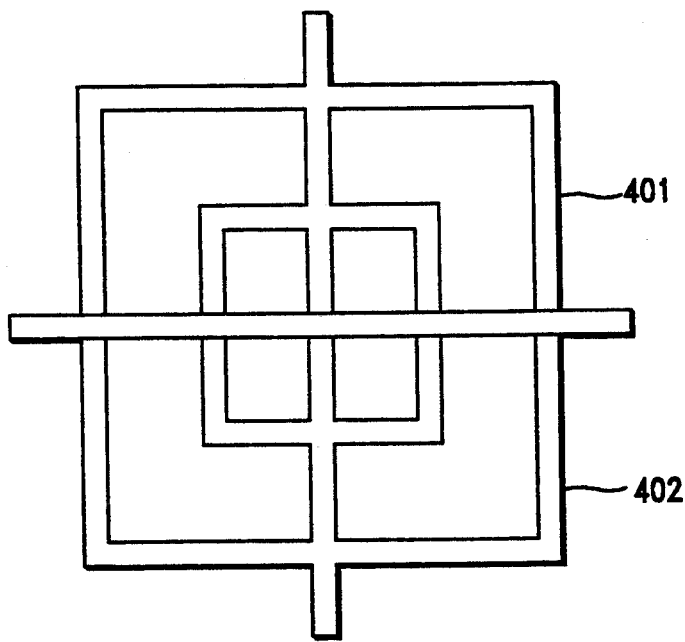
FIG.—7B

AUTOMATIC FOCUS ADJUSTER FOR PROJECTION DISPLAY SYSTEMS HAVING IN-OPERATION AND END-OF-OPERATION SYMBOLS SUPERIMPOSED OVER VIDEO DATA

BACKGROUND OF THE INVENTION

1. Field of the Invention

The present invention relates to projection type display systems for an enlarged projection onto a screen through a projection lens by modulating a liquid crystal panel in accordance with video data. Especially, the present invention relates to a small-sized, highly portable, projection type display system using a liquid crystal panel.

2. Related Technical Art

In a small-size, highly portable, projection type display system (e.g., a projection type display system using a liquid crystal panel as an optical modulation means), the projection lens has its focal length adjusted either manually by using mechanical means or automatically by using an electric motor operated by a switch, because the distance between the projection type display system and a screen changes each time the display system location changes.

This is specifically described with reference to FIG. 8. FIG. 8 is a diagram showing the structure of a focusing mechanism for adjusting the focal point of a projection lens using an electric motor operated by a switch.

If an operation switch 504 is depressed, pulses having a width proportional to the length of time the switch is depressed, are generated by a motor drive signal generator 502. As a result, a projection lens drive motor 501 drives a projection lens 505 for a length of time corresponding to the pulse width so that the projection lens 505 is driven toward a screen 507 to change its focal length.

If an operation switch 503 is depressed, projection lens 505 is driven, in the same manner as described above, away from screen 507 to change the focal length.

Using the operations as described thus far, operation switches 503 and 504 are operated in order to move projection lens 505 and alter the distance between projection lens 505 and screen 507 to a value equal to the focal length of projection lens 505. As a result, light modulated by an optical modulation block 506 in accordance with video signals is clearly projected onto screen 507 on an enlarged scale by projection lens 505. Reference numeral 508 designates a power supply for the motor drive signal generator 502.

Since the focal adjustment is accomplished by depressing operation switches 503 and 504, according to this background art, the switches are continuously depressed while observing the imaged focused on screen 507, until the focus is adjusted to be in the vicinity of an optimum focal adjustment point. After this, the projection lens forward operation switch 504 or the backward operation switch 503 are also depressed several times while observing the on screen image until the optimum focal point is reached. This causes problems in operating the system because this requires depressing operation switches 503 and 504 several times until the optimum focal point is set.

If a user with poor visibility is adjusting the focal point, the background art finds it difficult to obtain the optimum focal point because the user has to observe the image focused on screen 507 during adjustment.

SUMMARY OF THE INVENTION

Accordingly, this invention has an object to facilitate adjustments to the focus of a projection type display system to thereby improve the setting precision for an optimum focal point.

In order to achieve the above-specified object, according to the present invention, a projection type display system is provided which comprises: optical modulation means for modulating a light in accordance with video data; a projection lens system for projecting the modulated light onto a screen; and focal adjustment means for the projection lens system for adjusting the focal state of the image focused onto the screen, wherein the improvement resides in that said focal adjustment means includes a range finding unit for finding the distance between the projection lens and the screen with invisible light, and automatic adjustment means for adjusting the focal point of the projection lens system to an optimum focal point. Because an automatic focal adjustment means is provided, the optimum focal point can be set without difficulty to the user by adjusting the focal point automatically each time the projection type display system is moved. As a result, focal adjustment operations can be dramatically facilitated to improve the precision with which the optimum focal point is set.

If the projection type display system further comprises a pattern display unit which displays a fixed pattern when the automatic focal adjustment means stops performing focal adjustment, a user can easily confirm the moment when the operation of the automatic focal adjustment means ends so as to improve the operability of the focal adjustment.

If, moreover, the above pattern display unit is replaced by one that displays a first fixed pattern while the automatic focal adjustment means is undergoing focal adjustment operations, and a second fixed pattern when focal adjustment has ended and the automatic focal adjustment means is not in operation, focal adjustment operability is further improved because the user is able to easily confirm operation of the automatic focal adjustment means by virtue of different fixed patterns being displayed during and at the end of operation for the automatic focal adjustment means.

BRIEF DESCRIPTION OF THE DRAWINGS

FIGS. 7A and 7B are diagrams showing two kinds of focal adjustment fixed patterns to be applied to the projection type display system according to the third embodiment.

BEST MODE FOR CARRYING OUT THE INVENTION

Figure 1:
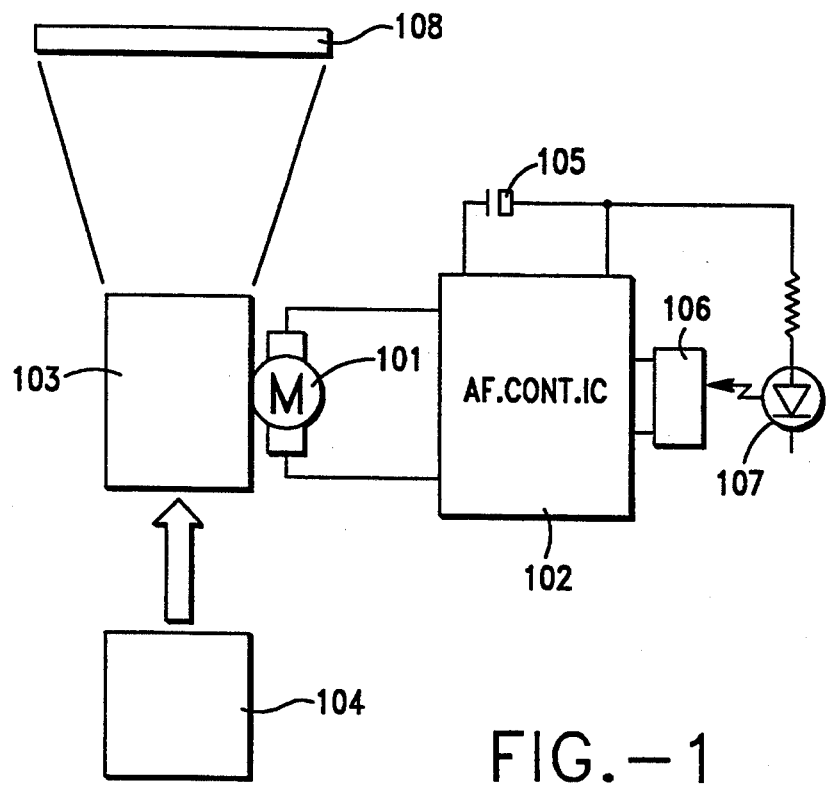
FIG. 1 is a block diagram showing the structure of a first embodiment of a projection type display system exemplifying a projection type display system according to the present invention.

Embodiments of the present invention are described below with reference to FIGS. 1 to 7. In this description, the same components are designated using identical reference characters, and any overlap in description is omitted.

Figure 2:
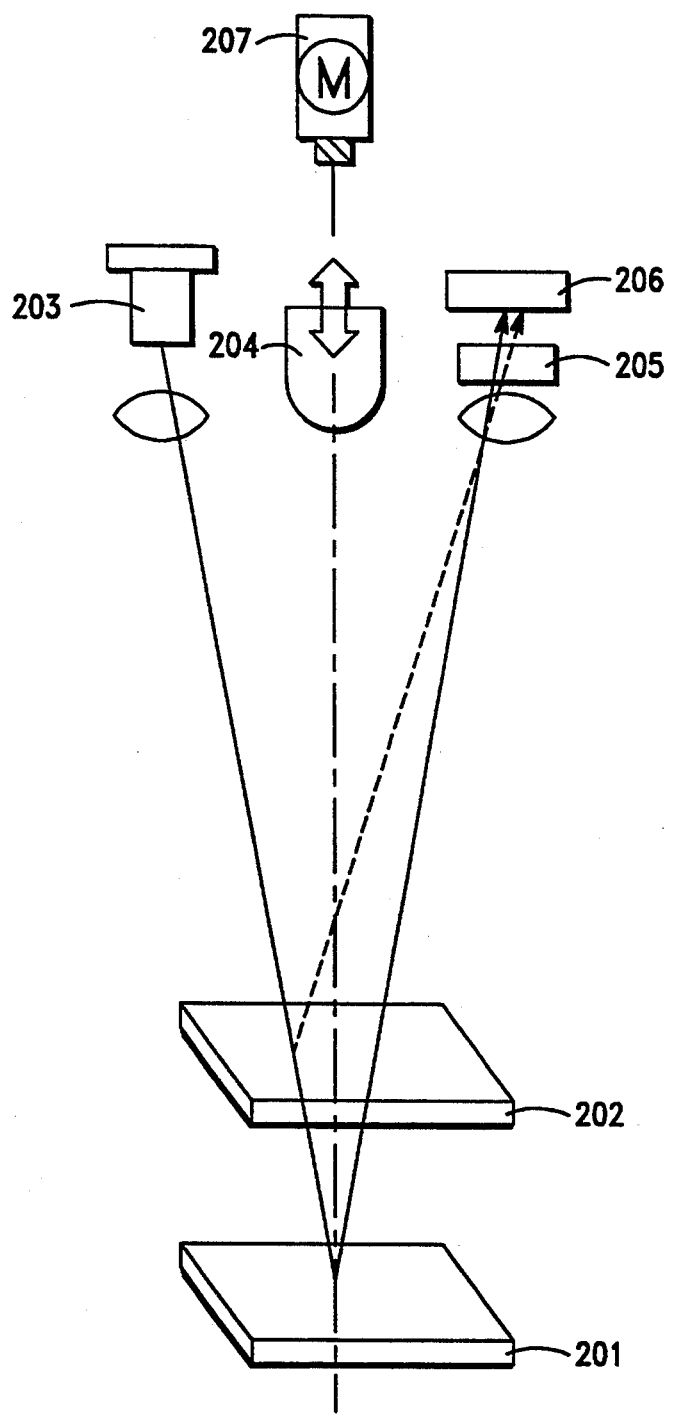
FIG. 2 is a diagram schematically showing automatic focal adjustment as applied to the projection type display system according to the first embodiment.

First, a first embodiment of a projection type display system according to the present invention is described with reference to FIGS. 1 through 3. In this embodiment, an automatic focal adjustment mechanism is constructed which adjusts the focal length of a projection lens by finding the distance between a projection lens and a screen using an infrared beam. Specifically, the distance between a projection lens 103 and a screen 108 is determined by emitting an infrared beam from an infrared beam emission unit 107, and by receiving the emitted infrared beam using an infrared beam reception unit 106. In accordance with the found distance, moreover, a drive signal is output by an auto-focus control type integrated circuit (AF.CONT.IC) 102 which drives a focal adjustment motor 101. In response to the drive signal, projection lens 103 is moved forward or backward to effect an automatic adjustment of the distance between the projection lens and screen may be made equal to the focal length of the projection lens. As a result, light is modulated in an optical modulation block 104 in accordance with video data, and projected on an enlarged scale by projection lens 103 so that it is clearly focused on screen 108. Incidentally, AF.CONT.IC 102 is connected to a power supply 105 to supply it with a drive voltage.

The principles of operation for the automatic adjustment mechanism as applied by the present embodiment are described next with reference to FIGS. 2 and 3. An infrared beam emitted from an infrared beam emission unit 203 is reflected by a screen 201 or a screen 202. Here, screen 201 is located where the focal point is optimally adjusted, whereas screen 202 is located in an out of focus position. Infrared beams thus reflected by screens 201 and 202 are deflected by a parallel prism 205 so that they are received by an infrared beam reception unit 206. A drive signal for a focal adjustment motor 207 is generated in accordance with the spot positions of the infrared beam received on infrared beam reception unit 206.

Figure 3:
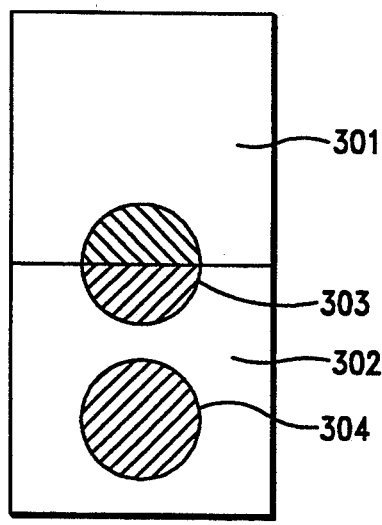
FIG. 3 is a diagram showing an infrared beam reception unit as applied to the projection type display system according to the first embodiment.

This infrared beam reception unit is divided, as shown in FIG. 3, into two areas, i.e., an area A 301 and an area B 302. If the focal length is automatically adjusted to the optimum position, the infrared beam spot extends evenly over areas A 301 and B 302, and are located at a spot position 303. On the other hand, if out of focus, the infrared beam spot position is offset into area A 301 or area B 302, as indicated by a spot position 304.

As a matter of fact, the reception unit itself is composed of a photo-electric conversion element or the like so that it generates an electric signal in proportion to the level of the received infrared beam. As a result, AF.-CONT.IC 102 can generate a drive signal for focus adjustment motor 207 on the basis of the infrared beam received by the infrared beam reception unit. For example, a focus adjustment motor drive signal is generated to move projection lens 304 forward, if the beam is received in area B 302. Thus, the infrared beam spot extends evenly, as indicated at spot position 303, over area A 301 and area B 302 so that the focus is automatically adjusted by moving projection lens 304 forward or backward until an optimum focal point is achieved by balancing the focal adjustment motor drive signal for moving projection lens 304 forward and the focal adjustment motor drive signal for moving projection lens 304 backward.

Therefore, a projection lens 204 is moved back and forth by focus adjustment motor 207 so that its focal length is automatically adjusted to optimize the relation between the screen and projection lens system as in the case of screen 201 having an optimum focal point.

Figure 4:
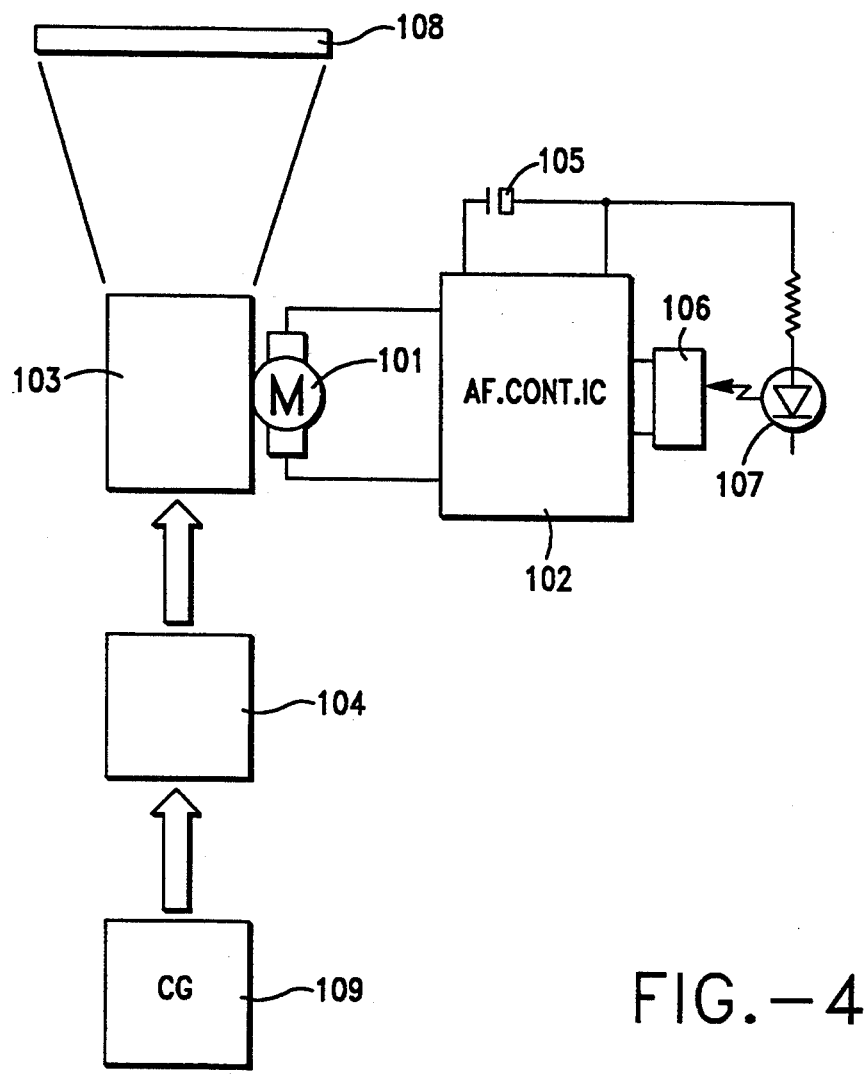
FIG. 4 is a block diagram showing the structure of a second embodiment of a projection type display system for exemplifying a projection type display system according to the present invention.
Figure 5:
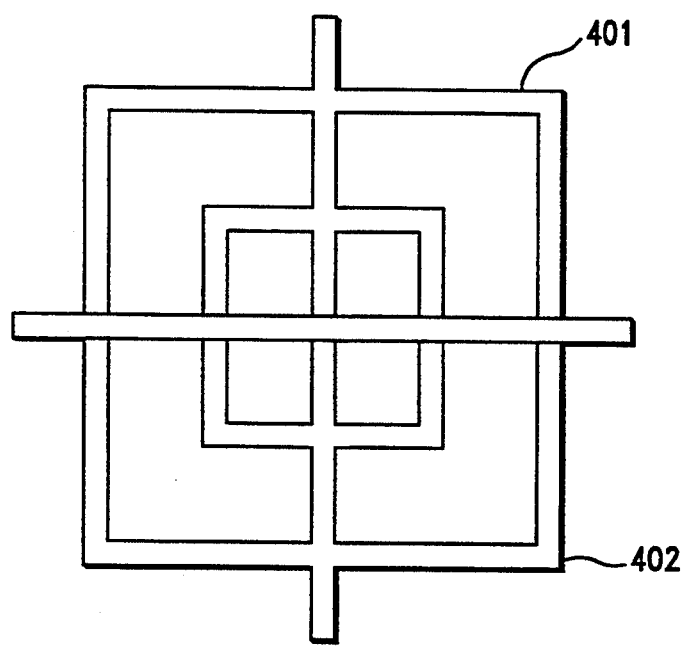
FIG. 5 is a diagram showing a focal adjustment fixed pattern to be applied to the projection type display system according to the second embodiment.

A second embodiment of a projection type display system according to the present invention is described next in reference to FIGS. 4 and 5. In this embodiment, a character generator or a type of pattern display unit capable of displaying one kind of fixed pattern is used in addition to the structure illustrated for the first embodiment so that a user can visually confirm an end in the operation of the auto-focus adjustment mechanism. The infrared beam is emitted from infrared beam emission unit 107 and is received by an infrared beam reception unit 106. Consequently, the distance between projection lens 103 and screen 108 is measured, and a drive signal for focus adjustment motor 101 is generated by AF.-CONT.IC 102 in accordance with this measured distance. AF.CONT.IC 102 is connected to power supply 105 to supply the drive voltage.

A drive signal is generated by AF.CONT.IC 102 so that focus adjustment motor 101 is driven to move projection lens 103 forward or backward. As a result of forward or backward movement of projection lens 103, auto-focusing is effected such that the distance between projection lens 103 and screen 108 may be made equal to the focal length of projection lens 103. The principle of this automatic adjustment has been described above. Therefore, light that has been modulated in optical modulation block 104 in accordance with the video data is projected on an enlarged scale by projection lens 103 and focused on screen 108. Moreover, a character generator (i.e., CG) 109 generates one kind of fixed pattern (as shown in FIG. 5), which is superimposed on the video data and displaced on screen 108.

Figure 6:
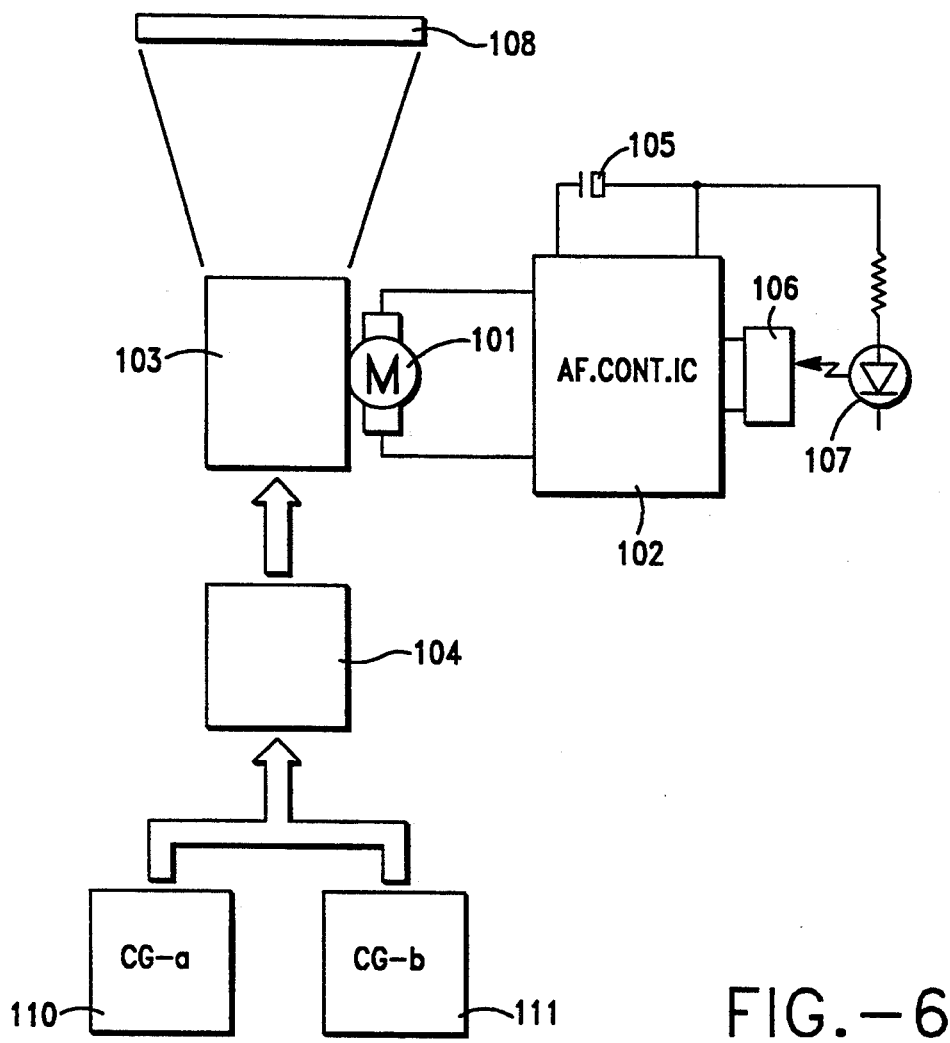
FIG. 6 is a block diagram showing the structure of a third embodiment of a projection type display system exemplifying a projection type display system according to the present invention.
Figure 8:
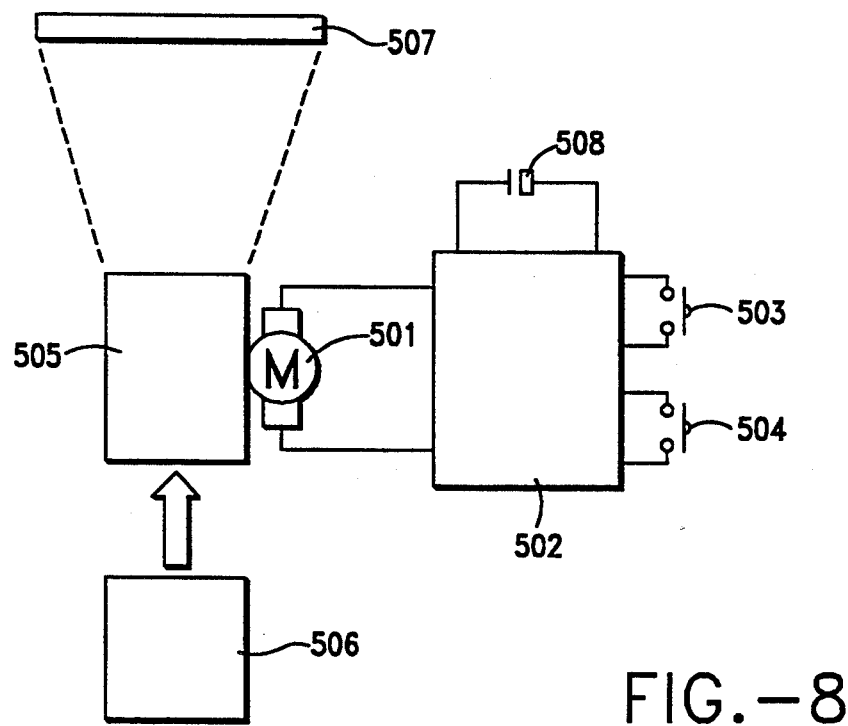
FIG. 8 is a block diagram showing a projection type display system according to the background art of the present invention.

A third embodiment of a projection type display system according to the present invention is described next with reference to FIGS. 6 and 7. The present embodiment is equipped, in addition to the structure of the first embodiment, with a character generator or a pattern type display unit capable of displaying two kinds of fixed patterns so that a user can visually confirm in-operation and end states of the auto-focusing mechanism.

The distance between projection lens 103 and screen 108 is measured by emitting an infrared beam from infrared beam emission unit 107 and by receiving it at infrared beam receiving unit 106. In accordance with the measured distance, AF.CONT.IC 102 generates the drive signal to drive focal adjustment motor 101. AF.-CONT.IC 102 is connected with power supply 105 so that it is supplied with the drive voltage. Since projection lens 103 is moved forward or backward by focal adjustment motor 101, the distance between projection lens 103 and screen 108 is automatically adjusted so that it is made equal to the focal length of projection lens 103. As a result, the light modulated in optical modulation block 104, in accordance with the video data, is projected on an enlarged scale by projection lens 103 and is projected onto screen 108. Reference characters CG-a 110 and CG-b 111 designate character generators, of which the former CG-a 110 generates a fixed pattern indicating that the auto-focusing mechanism is in operation whereas the latter CG-b 111 generates a fixed pattern indicating that the auto-focusing mechanism has ended its operation. The fixed pattern data generated by the individual character generators are superimposed on the video data in optical modulation block 103 and are displayed on screen 108. The switching of those character generators CG-a 110 and CG-b 111 is accomplished in response to signals which are generated by AF.CONT.IC 102 for the different operations of the automatic adjustment mechanism.

FIG. 7A is a fixed pattern which is output from the CG-a 110 to indicate that the auto-focusing mechanism is in operation, and FIG. 7B is a fixed pattern which is output from the CG-b 111 to indicate that the auto-focusing mechanism has ended its operation. In the present embodiment, a pattern composed of offset upper and lower components is displayed on screen 108, as shown in FIG. 7A, while the auto-focusing mechanism is in operation (because of being out of focus). When operation of the auto-focusing mechanism ends, on the other hand, a pattern having a complete shape is displaced on screen 108, as shown in FIG. 7B.

INDUSTRIAL APPLICABILITY

As has been described above, according to the present invention, the focal adjustment can be drastically simplified so that the optimum focal point is set automatically by providing the projection type display system with an auto-focusing mechanism, so that the precision of focal adjustment is drastically improved. Especially in case of small-size, highly portable, projection type display systems using liquid crystal panels as optical modulation elements, where focal adjustment occupies a large weight in the operation because the display system is portable. By adopting the structure of the present invention, therefore, there can be strongly appealed the merits that the operability and precision of focal adjustment are remarkably improved and that the liquid crystal projection type display system features small size and high portability.

In the case of a fixed pattern, moreover, a user is able to easily know the focal state of an image on the screen by display of a pattern indicating the end of auto-focusing mechanism operation. In this case, by displaying two different kinds of fixed patterns for indicating that the auto-focusing mechanism is in operation and has ended its operation, the user is easily able to know the operational state of the auto-focusing mechanism from not only the focal state of the image on the screen but also kind of fixed pattern displayed.

By adopting the structure of the present invention, therefore, the operability of the focal adjustment can be drastically improved to enhance the additional value of the auto-focusing mechanism better.

What is claimed is:

1. A projection type display system comprising:
 a) optical modulation means for modulating a light in accordance with video data;
 b) a projection lens system having a projection lens for projecting the modulated light on a screen;
 c) a range finding unit for finding the distance between said projection lens and said screen with an invisible light, said range finding unit including a light emitting element for irradiating said screen with said invisible light, and a light reception element having at least two light receiving areas for receiving the reflected light from said screen to output an electrical signal corresponding to the light receiving position of said reflected light;
 d) an automatic adjustment means for adjusting the focal point of said projection lens system, wherein said automatic adjustment means includes a distance changing means for changing the distance from said screen to said projection lens, and a control means for sending such a control signal to said distance changing means that said reflected light may irradiate a desired position in said light receiving areas on the basis of said electrical signal; and
 e) said automatic adjustment means further includes a pattern display unit for displaying on said screen, such that it is superimposed over said video data, a fixed pattern indicating that said automatic adjustment means has ended its focal adjustment, wherein said fixed pattern has a first rectangle, a second rectangle smaller than said first rectangle and centered within said first rectangle, and a cross having a vertical component that intersects the horizontally-oriented sides of said first and second rectangles, and having a horizontal component that intersects the vertically-oriented sides of said first and second rectangles, said cross being co-centered with said first and second rectangles.

2. A projection type display system comprising:
 a) optical modulation means for modulating a light in accordance with video data;
 b) a projection lens system, coupled to said optical modulation means, having a projection lens for projecting the modulated light on a screen;
 c) a distance changing means for changing the distance from said screen to said projection lens;
 d) a range finding unit for finding the distance between said projection lens and said screen with an invisible light, said range finding unit comprising
  (i) a light emitting element for irradiating said screen with said invisible light, and
  (ii) a light reception element having at least two light receiving areas for receiving light reflected from said screen to output an electrical signal corresponding to the light receiving position of said reflected light;
 e) a control means, coupled to said distance changing means and to said light receiving areas, for sending such a control signal to said distance changing means that said reflected light may irradiate a desired position in said light receiving areas on the basis of said electrical signal; and
 f) a pattern display unit, coupled to said optical modulation means, for displaying on said screen, superimposed on said video data, a first fixed pattern during a focal adjustment period, and a second fixed pattern when focal adjustment is completed.

3. The system of claim 2, wherein said pattern display unit comprises a plurality of character generators.

4. The system of claim 2, wherein said first and second fixed patterns are displayed as a patterns having an upper component and a lower component.

5. The system of claim 4 wherein said first fixed pattern comprises said upper and lower components laterally offset from each other.

6. The system of claim 5, wherein said second fixed pattern comprises said upper and lower components displayed without lateral offset.

* * * * *